(12) United States Patent
Tsirkin

(10) Patent No.: US 9,600,190 B2
(45) Date of Patent: Mar. 21, 2017

(54) VIRTUAL MACHINE FUNCTIONS FOR MULTIPLE PRIVILEGED PAGES

(71) Applicant: Red Hat Israel, Ltd., Ra'anana (IL)

(72) Inventor: Michael Tsirkin, Raanana (IL)

(73) Assignee: Red Hat Israel, Ltd., Ra'Anana (IL)

( * ) Notice: Subject to any disclaimer, the term of this patent is extended or adjusted under 35 U.S.C. 154(b) by 194 days.

(21) Appl. No.: 14/633,413

(22) Filed: Feb. 27, 2015

(65) Prior Publication Data

US 2016/0253110 A1 Sep. 1, 2016

(51) Int. Cl.
*G06F 12/00* (2006.01)
*G06F 13/00* (2006.01)
*G06F 3/06* (2006.01)
*G06F 9/455* (2006.01)
*G06F 12/14* (2006.01)

(52) U.S. Cl.
CPC ............ *G06F 3/0619* (2013.01); *G06F 3/065* (2013.01); *G06F 3/067* (2013.01); *G06F 9/45545* (2013.01); *G06F 9/45558* (2013.01); *G06F 12/14* (2013.01); *G06F 2009/45583* (2013.01); *G06F 2009/45587* (2013.01); *G06F 2212/1052* (2013.01)

(58) Field of Classification Search
CPC . G06F 9/52; G06F 9/528; G06F 12/14; G06F 12/1483
USPC .................................. 711/E12.091, E12.096
See application file for complete search history.

(56) References Cited

U.S. PATENT DOCUMENTS

| 8,527,673 | B2 | 9/2013 | Mahalingam et al. | |
|---|---|---|---|---|
| 8,799,879 | B2 | 8/2014 | Wright et al. | |
| 8,875,295 | B2 | 10/2014 | Lutas et al. | |
| 2002/0069335 | A1* | 6/2002 | Flylnn, Jr. ............. | G06F 3/0619 711/153 |
| 2006/0161735 | A1* | 7/2006 | Kiyota ................. | G06F 9/3004 711/129 |
| 2007/0006175 | A1* | 1/2007 | Durham ................. | G06F 21/54 717/131 |
| 2012/0102135 | A1 | 4/2012 | Srinivasan et al. | |

(Continued)

OTHER PUBLICATIONS

Mihai Dontu et al., "Zero-Footprint Guest Memory Introspection from Xen", Aug. 18, 2014, Technical Project Manager, Bitdefender; Principal Engineer, Intel, http://events.linuxfoundation.org/sites/events/files/slides/Zero-Footprint%20Guest%20Memory %20Introspection%20from%20Xen%20_%20draft11.pdf.

(Continued)

*Primary Examiner* — Sean D Rossiter
(74) *Attorney, Agent, or Firm* — Haynes and Boone, LLP

(57) ABSTRACT

A method includes, with a guest, executing a first virtual machine function, determining a first pointer value stored in a register of a processor running on the host system while the first virtual machine function is executed, the first pointer value pointing to a first page table corresponding to a default page table, the first page table indicating that the guest has access to a first privileged page, switching to the first page table, executing a second virtual machine function, the second virtual machine function, determining a second pointer value stored in the register of the processor while the second virtual machine function is executed, the second pointer value pointing to a second page table corresponding to the default page table, the second page table that indicates that the guest has access to a second privileged page, and switching to the second page table.

20 Claims, 5 Drawing Sheets

(56) References Cited

U.S. PATENT DOCUMENTS

| | | | |
|---|---|---|---|
| 2012/0151117 A1* | 6/2012 | Tuch | G06F 9/45558 |
| | | | 711/6 |
| 2012/0215989 A1* | 8/2012 | Moyer | G06F 12/1416 |
| | | | 711/145 |
| 2013/0086299 A1* | 4/2013 | Epstein | G06F 12/1475 |
| | | | 711/6 |
| 2013/0132690 A1* | 5/2013 | Epstein | G06F 12/1416 |
| | | | 711/159 |
| 2013/0276057 A1 | 10/2013 | Smith et al. | |
| 2014/0013326 A1 | 1/2014 | Neiger et al. | |
| 2014/0173169 A1* | 6/2014 | Liu | G06F 12/1009 |
| | | | 711/6 |
| 2014/0189690 A1 | 7/2014 | Ramakrishnan | |
| 2016/0188354 A1* | 6/2016 | Goldsmith | G06F 9/45558 |
| | | | 718/1 |
| 2016/0246732 A1* | 8/2016 | Shanbhogue | G06F 12/1036 |

OTHER PUBLICATIONS

Jun Nakajima, "Xen as High-Performance NFV Platform", Aug. 18, 2014, Intel Corporation, http://events.linuxfoundation.org/sites/events/files/slides/XenAsHighPerformanceNFVPlatform.pdf.

Neel Natu et al., "Nested Paging in Bhyve", The FreeBSD Project, http://people.freebsd.org/~neel/bhyve/bhyve_nested_paging.pdf.

* cited by examiner

VIRTUAL MACHINE FUNCTIONS FOR MULTIPLE PRIVILEGED PAGES

BACKGROUND

The present disclosure relates generally to virtual machine management, and more particularly to virtual machine functions.

A virtual machine is software that is executed on hardware to create a virtualization of a physical computer system. Virtual machines may function as self-contained platforms that run their own operating systems and software applications.

A host machine, such as a server computer may concurrently run one or more virtual machines using software that is referred to as a hypervisor. The hypervisor allocates a certain amount of the host's resources, such as the host's underlying physical processors and memory devices, to each of the virtual machines, allowing the virtual machines to transparently access the host's resources.

Each virtual machine may use the allocated resources to execute applications, including operating systems referred to as guest operating systems. Each virtual machine guest operating system may be accessed by one or more local or remote clients to perform computing tasks.

SUMMARY

A method includes, with a guest running on a host computing system, executing a first virtual machine function, determining a first pointer value stored in a register of a processor running on the host system while the first virtual machine function is executed, the first pointer value pointing to a first page table corresponding to a default page table, the first page table indicating that the guest has access to a first privileged page, in response to executing the first virtual machine function, switching to the first page table, with the guest, executing a second virtual machine function, the second virtual machine function, determining a second pointer value stored in the register of the processor while the second virtual machine function is executed, the second pointer value pointing to a second page table corresponding to the default page table, the second page table that indicates that the guest has access to a second privileged page, and in response to executing the second virtual machine function, switching to the second page table.

A method includes storing a first virtual machine function instruction in memory, storing a first Extended Page Table (EPT) corresponding to a default EPT, the first EPT indicating that a guest has access to a first privileged page and that the guest does not have access to all other privileged pages, storing a second virtual machine function instruction in memory, and storing a second EPT corresponding to the default EPT, the second EPT indicating that a guest has access to a second privileged page and that the guest does not have access to all other privileged pages.

A method includes, with a guest running on a host computing system, executing a first virtual machine function instruction, the first virtual machine function instruction configured to provide the guest with write access to a first privileged page, with the guest, writing data to the first privileged page, with the guest, executing a second virtual machine function instruction to deny the guest write access to the first privileged page, with the guest, executing a third virtual machine function instruction, the second virtual machine function configured to provide the guest with access to a second privileged page, with the guest, writing data to the second privileged page, and with the guest, executing a fourth virtual machine function instruction to deny the guest write access to the second privileged page.

Figure 1:
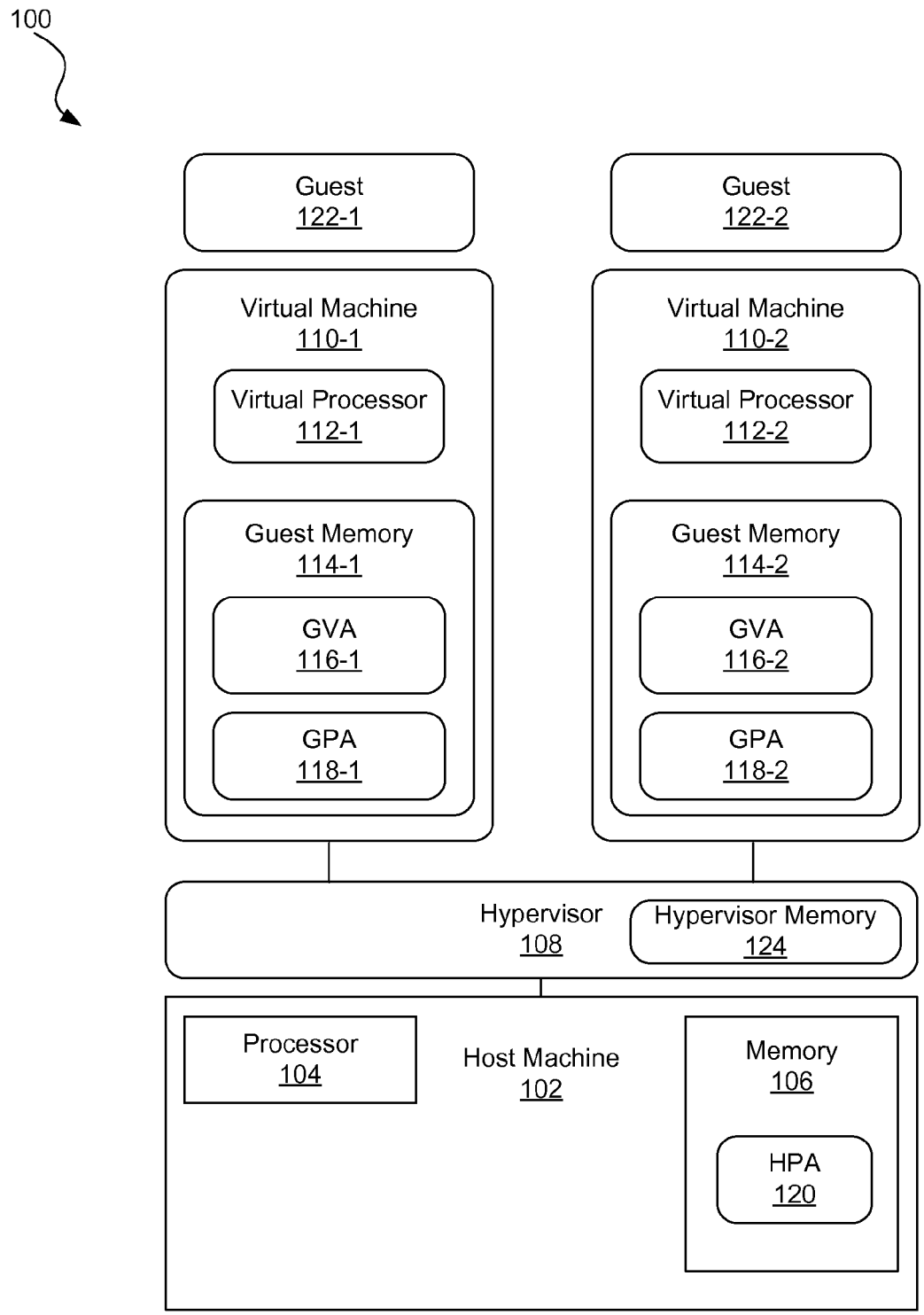
FIG. 1 is a diagram showing illustrative virtual machines running on a host machine, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, a host machine may run several virtual machines. The processor for such a host machine switches to different contexts based on the virtual machine that is currently being executed. For example, when a processor switches to a particular virtual machine, it is referred to as a virtual machine entry. When the processor switches to a different context, such as to that of another virtual machine or to that of the hypervisor, it is referred to as a virtual machine exit. Switching contexts involves some overhead and thus it is desirable to minimize the switching of contexts.

The Instruction Set Architecture (ISA) for some processors includes an instruction referred to as VMFUNC. The VMFUNC instruction can be used to provide a number of useful operations such as allowing communication between different virtual machines or communication between a virtual machine and the hypervisor without causing an exit. This is done by giving the guest running on a virtual machine access to a privileged page of memory. The page may be privileged because it is part of hypervisor memory or guest memory for a different virtual machine. Typically, a guest does not have access to such pages for security purposes. But, use of the VMFUNC, along with various other security measures, can allow such write access in a secure manner.

An operation that uses the VMFUNC instruction, or similar processor instruction, is referred to as a virtual machine function. Virtual machine functions typically grant a guest access to only a single page of memory. For security purposes, a virtual machine function typically allows access to only a single page of memory. If a guest has access to the page tables that translate guest virtual addresses into guest physical addresses, and a virtual machine has access to more than one page of privileged memory, then the guest could maliciously or inadvertently corrupt or confuse the virtual machine function. But, it could be useful to have a virtual machine function that provides access to multiple pages of memory.

According to principles described herein, a technique is used to allow a guest access to multiple pages of privileged memory. Specifically, the guest can be provided with more than one virtual machine function, each virtual machine function granting access to a different page of privileged memory. For example, a first virtual machine function may provide write access to a first privileged page while disabling write access to all other privileged pages. Additionally, a second, different virtual machine function may provide write access to a second privileged page while disabling write access to all other privileged pages, including the first privileged page. Through use of these multiple virtual machine functions, the guest system may have access to multiple pages of privileged memory.

FIG. 1 is a diagram showing illustrative system 100 of virtual machines 110 running on a host machine 102. According to the present example, a physical system, such as a host machine 102 uses a hypervisor 108 to manage multiple virtual machines 110. Each of the virtual machines 110 provides virtual resources, such as a virtual processor 112 and virtual memory (guest memory) 114 to a guest operating system 122.

The host machine 102 includes hardware such as a processor 104 for executing software (e.g., machine readable instructions) and using or updating data stored in memory 106. The processor 104 may represent one or more processors acting in concert. The memory 106 may be one or more of many different types of memory. Some types of memory, such as solid state drives typically have relatively larger storage volume but relatively slower performance. Other types of memory, such as those used for Random Access Memory (RAM), are optimized for speed and are often referred to as "working memory." The various types of memory may store information in the form of software and data. The software may include an operating system, a hypervisor 108 and various other software applications.

The memory 106 may be divided into units referred to as pages. A page is a specified amount of contiguous memory that represents the smallest unit in which an operating system allocates for various purposes. A page of memory is a set range of addresses to which data can be stored. The operating system may swap pages from working memory to longer term storage such as a non-volatile storage. The pages in host memory correspond to Host Physical Addresses (HPAs) 120. The HPAs 120 may be allocated for use by the host machine 102, the hypervisor 108, or one of the virtual machines 110.

The hypervisor 108 supports a first virtual machine 110-1 having a first virtual processor 112-1 and guest memory 114-1. The hypervisor 108 also supports a second virtual machine 110-2 having a second virtual processor 112-2 and guest memory 114-2. Although two virtual machines 110 are illustrated, other examples include fewer than two virtual machines or more than two virtual machines.

The hypervisor 108 is provided with some memory referred to as hypervisor memory 124. Hypervisor memory 124 corresponds to physical pages in host memory 106. Thus, a subset of the pages in host memory is allocated for use by the hypervisor. The hypervisor 108 can use this memory to perform various tasks related to management of the virtual machines 110.

In the present example, virtual machines 110 are platforms on which operating systems referred to as guest operating systems 122 run. The guest operating systems 122 may be referred to as "guests." A guest 122-1 running on the first virtual machine 110-1 may be a different operating system than another guest 122-2 running on the second virtual machine 110-2. Guests 122 may also be different operating systems than the operating system running on host machine 102.

The hypervisor 108 manages the host machine 102 resources and makes them available to one or more guests that may be alternately or concurrently executed by the host machine 102. Hypervisor 108 may manage hardware resources and arbitrates requests of the multiple guests. For example, the hypervisor 108 may present a virtual set of CPU, memory, I/O, and disk resources to each guest based on the physical hardware and/or based on a standard and consistent selection of custom hardware. A virtual machine 110 is provided its own address space in memory, its own processor resource allocation, and its own device input/output (I/O) using its own virtual device drivers.

In the present example, the hypervisor 108 provides a virtual machine 110, which is an underlying emulation of host machine 102, to a guest 122. A virtual machine 110 can be, for example, a hardware emulation, full virtualization, para-virtualization, and operating system-level virtualization virtual machine. The term virtual machine generally refers to part of a host system that is visible to a guest 122. A virtual machine 110 may include, for example, virtual CPUs 112, one or more virtual devices such as an emulated NIC or disk, physical devices over which a guest 122 is given partial or full control, virtual firmware such as a Basic Input/Output System (BIOS) and/or an Extensible Firmware Interface (EFI), an Advanced Configuration and Power Interface (ACPI), virtual memory 114 (e.g., guest memory), and so forth.

In the present example, a guest 122 manages resources of the virtual machine 110. The term "guest" refers to the computer readable instructions run on a hypervisor 108 that is installed on a disk, loaded into memory, or currently running. A guest 122 may include, for example, a copy of firmware in memory, an operating system, additional installed software, a browser, applications running in a browser, and so forth. In one example, a virtual machine 110 running on a host machine 102 may run the same or a different guest operating system as the host operating system 114. Some examples of types of operating systems that may be run include LINUX, UNIX, OS X, WINDOWS, and so forth.

The guest memory 114 is represented by Guest Virtual Addresses (GVAs) and Guest Physical Addresses (GPAs). The hypervisor 108 maps HPAs 120 to GPAs 118. Specifically, a page of host memory is mapped to a page of guest memory 114 identified by GPAs 118. A page table is used to maintain this mapping. Each entry in the page table provides a mapping from a GPA 118 to an HPA 120. Similarly, the guest maps pages identified by GVAs 116 to pages of GPAs 118. A page table is also used for such a mapping. The GVAs 116 are provided to various applications that run on the guest 122.

The hypervisor 108 provides sets of access privileges, referred to as "views," which define a virtual machine's privileges to the different pages. These views may define execution access, write access, and read access. A guest 122 is typically not given access to pages other than those associated with the GPA pages of the corresponding virtual machine 110. For example, a guest 122 is not given access to pages in host memory 106 that are mapped to hypervisor memory 124 or GPAs 118 of a different virtual machine. For example, virtual machine 110-1 has access to HPAs 120 that are mapped to GPAs 118-1, but not HPAs 120 that are mapped to GPAs 118-2. This is because GPAs 118-2 are associated with a different virtual machine 110-2.

But, as described above, it can be useful to give a virtual machine 110 and its respective guest 122 access to a page of memory to which it would not otherwise have access. Such access can allow the virtual machine to send information to either another virtual machine or to the hypervisor without a virtual machine exit. Thus, the VMFUNC instruction provides a guest with different views, which allow access to a virtual machine function that executes a segment of trusted code. The trusted code can perform various write operations to privileged pages (i.e., pages of hypervisor memory or guest memory for a different guest).

Figure 2:
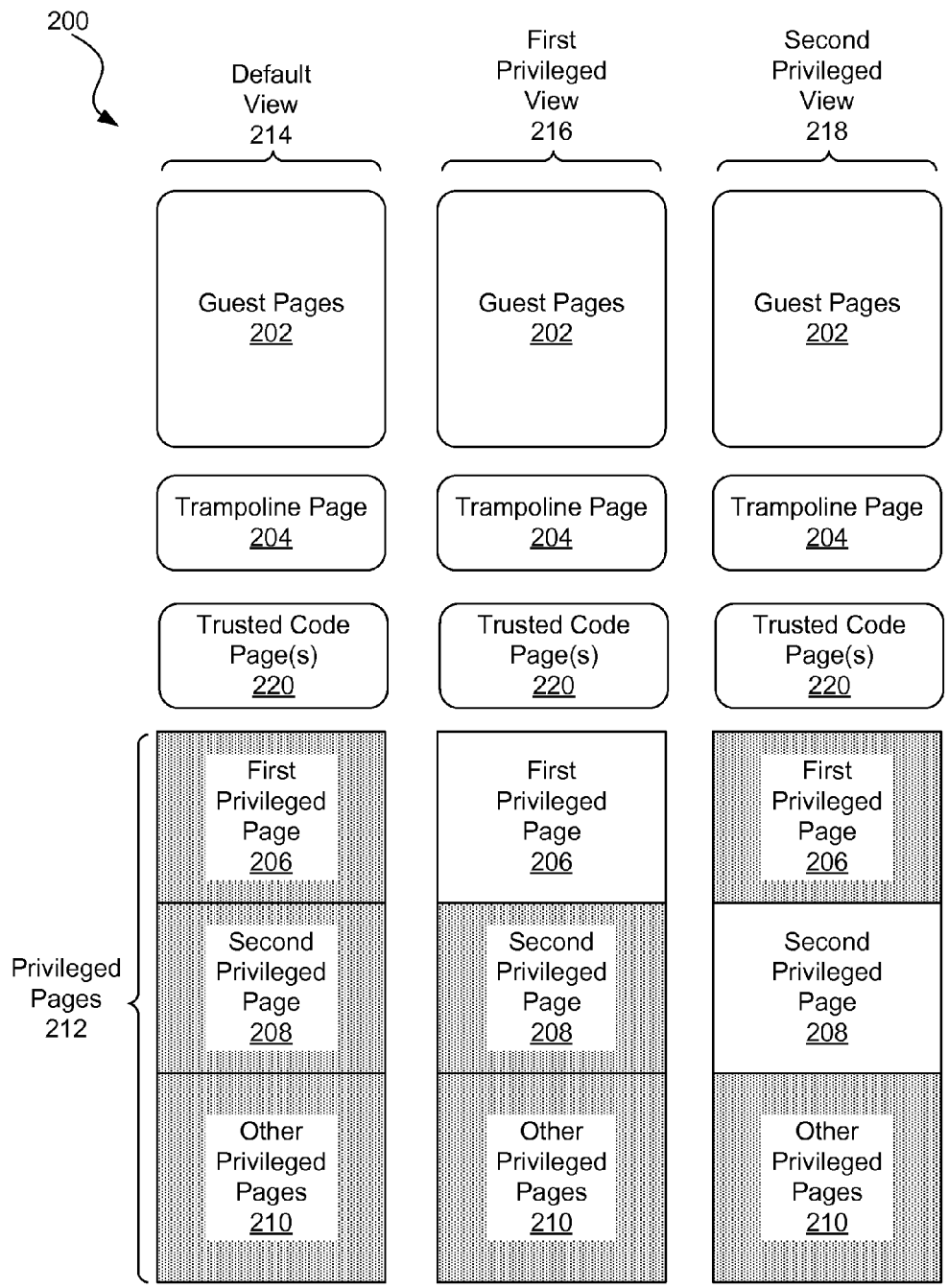
FIG. 2 is a diagram showing various page views associated with different virtual machine functions, according to one example of principles described herein.

FIG. 2 is a diagram 200 showing various page views 214, 216, 218 associated with different virtual machine functions. According to the present example, the pages within host memory (e.g., 106, FIG. 1) from the perspective of a particular guest (e.g., 122-1, FIG. 1) are divided up into guest pages 202, a trampoline page 204, and privileged pages 212.

The guest pages 202 correspond to pages of guest memory (e.g. 114, FIG. 1) that have been allocated for use by the guest. The guest pages 202 may store code associated with applications run by the guest system. The guest pages 202 may also store data associated with those applications.

The trampoline page 204 typically has different access privileges than the guest pages 202. Specifically, the guest does not have write access to the trampoline page 204. The trampoline page is typically where the VMFUNC instruction is stored. Additionally, as will be described in further detail below, the trampoline page may include code that calls a method stored within the trusted code pages 220. The trusted code pages 220 are pages in which the guest only has access through use of the virtual machine function instructions.

The privileged pages 212 correspond to portions of memory to which the guest does not typically have access. A privileged page 212 may be a portion of hypervisor memory. Alternatively, a privileged page 212 may be a portion of guest memory for a different guest. The privileged pages 212 include a first privileged page 206, a second privileged page 208, and all other privileged pages 210.

The views 214, 216, 218 may be defined by page tables. For example, each view 214, 216, 218 may have its own page table, sometimes referred to as an Extended Page Table (ETP). For each entry in the page table, access privileges can be defined through use of specified bits. For example, there may be a write access bit, a read access bit, and an execution access bit. A logical 1 for the write access bit of a particular page indicates that the guest has access to that page. But, a logical 0 for the write access bit indicates that the guest does not have write access to that page.

The default view 214 represents the normal view provided to the guest. In this view, access to all privileged pages is disabled. In the default view 214, the guest may have full access to the guest pages 202. Specifically, the guest has execute access to the guest pages 202, which gives the guest the ability to execute code stored within those pages. The guest also has read access to the guest pages 202, which gives the guest the ability to read data stored in the guest pages. The guest also has write access to the guest pages 202, which gives the guest the ability to write data to the guest pages. In the default view, the guest has no access to the trusted code 220 pages.

According to principles described herein, a particular virtual machine function will provide the guest with a different view, particularly, the first privileged view 216. This privileged view may be defined through use of an alternative page table, which will be referred to as the first page table. The first page table indicates that the guest has write access to the first privileged page 206. But, write access to all other pages 210 and the second privileged page 208 is disabled.

A different virtual machine function will provide the guest with a different view, particularly, the second privileged view 218. The second privileged view is defined by a second page table. The second page table indicates that the guest has write access to the second privileged page. But, write access to all other privileged pages 210, including the first privileged page 206 is disabled. In either privileged view 216, 218, the guest may also have execution access to the trusted code pages 220.

Figure 3:
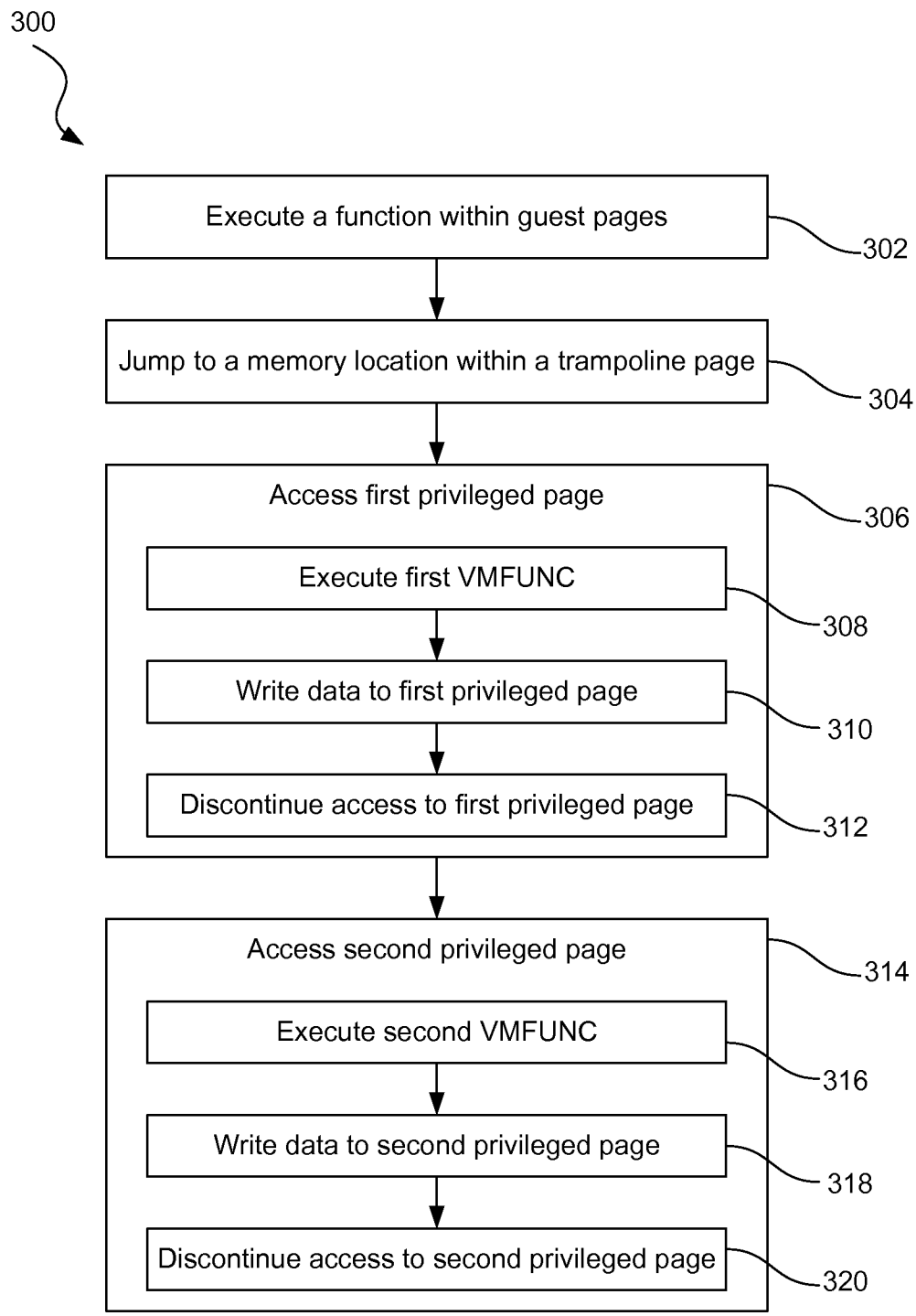
FIG. 3 is a flowchart showing an illustrative method for using different virtual machine functions to gain access to different privileged pages, according to one example of principles described herein.

FIG. 3 is a flowchart showing an illustrative method for using different virtual machine functions to gain access to different privileged pages. According to the present example, the method includes a step 302 at which the guest executes a function that is stored within the guest pages. This function may be, for example, a function to write data to one or more data structures stored on more than one privileged page. As described above, virtual machine functions typically expose only one privileged page because a guest, which has control over GVA to GPA translations, could manipulate the translation to confuse a virtual machine function with access to more than one privileged page. But, using techniques described herein, data can be written to multiple privileged pages through use of multiple virtual machine functions.

The method 300 further includes a step 304 for jumping to a memory location within a trampoline page. The trampoline page includes trusted code. Because write access is never granted for the trampoline page, this code can remain trusted. The trampoline code may include the actual VMFUNC instruction as well as the code to write data to the privileged pages.

VMFUNC instructions can be configured based on the values of the processor registers when the VMFUNC instruction is registered. For example, the number stored in the EAX register can be used to determine how the view is to be changed. For example, a VMFUNC executed with a 1 in the EAX register indicates that the view is to be switched to a privileged view. A VMFUNC executed with a 0 in the EAX register indicates that the view is to be switched to the default view. Additionally, the ECX register may store a pointer value that indicates an alternate page table to be used by the guest. As described above, the alternate page table may have different access privileges to specific pages. The code to load the ECX register with such a value may also be stored within the trampoline code, so as not to be maliciously changed. Thus, a VMFUNC is executed in association with values stored in some of the processor registers.

The method further includes a step 306 for accessing a first privileged page (e.g. 206, FIG. 2). This is done by performing a set of steps. At step 308, a first VMFUNC instruction is executed. This switches the view to the first privileged view (e.g., 216, FIG. 2). In some examples, the virtual machine is configured so that executing the VMFUNC(1) (with EAX register having the value 1) switches the view so that the guest execution access to untrusted guest code (e.g., stored in guest pages 202, FIG. 2) is disabled, and guest execution access to trusted code (e.g., stored in trusted code pages 220, FIG. 2) is enabled. Additionally, by executing the VMFUNC instruction, the guest is granted write access to the first privileged page.

After being granted write access to the first privileged page, the method proceeds to step 310, at which data is written to the first privileged page. This may be done by calling a function that is stored within the trusted code pages. For example, the guest may execute code that causes data stored in the guest pages to be written to the first privileged page. This is allowed because the guest still has read access to the guest pages while in the first privileged view.

At step 312, the guest access to the first privileged page is discontinued, and the view returns to the default view (e.g. 214, FIG. 1). In one example, the virtual machine is configured so that executing a VMFUNC(0) (with EAX register value set to 0) causes execution access to the trusted code pages to be disabled, and causes execution access to untrusted code of the guest pages to be enabled. Additionally, the guest no longer has write access to the first privileged page.

The method further includes a step 314 for accessing a second privileged page (e.g. 208, FIG. 2). This is done by performing a set of steps. At step 316, a second VMFUNC instruction is executed. This switches the view to the second privileged view (e.g., 218, FIG. 2). In other words, the view is changed so that the guest execution access to untrusted guest code (e.g., stored in guest pages 202, FIG. 2) is disabled, and guest execution access to trusted code (e.g., stored in trusted code pages 220, FIG. 2) is enabled. Additionally, by executing the VMFUNC instruction, the guest is granted write access to the second privileged page.

After being granted write access to the second privileged page, the method proceeds to step 318, at which data is written to the second privileged page. This may be done by calling a function that is stored within the trusted code pages. For example, the guest may execute code that causes data stored in the guest pages to be written to the second privileged page. This is allowed because the guest still has read access to the guest pages while in the second privileged view.

At step 320, the hypervisor discontinues guest access to the second privileged page and returns the view to the default view. In other words, the view is changed so that access to the trusted code pages is disabled, and execution access to untrusted code of the guest pages is enabled. Additionally, the guest no longer has write access to the second privileged page.

Figure 4:
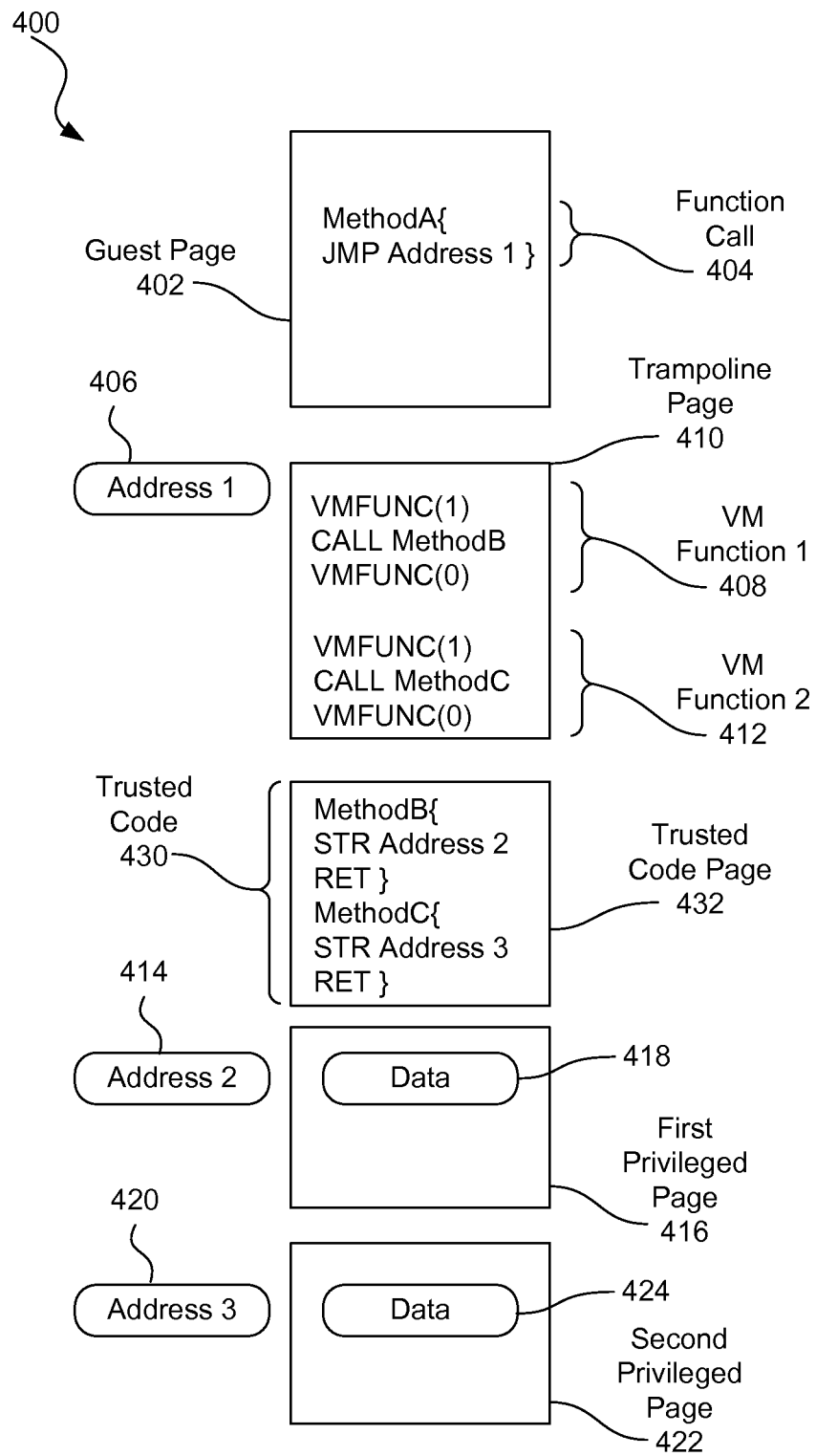
FIG. 4 is a diagram showing code placement for virtual machine functions for multiple pages, according to one example of principles described herein.

FIG. 4 is a diagram showing code placement for virtual machine functions for multiple pages. It is noted that the code illustrated is merely pseudo code and does not necessarily correspond to actual instructions of a practical implementation of principles described herein. Rather, the instructions are used to illustrate the principles described herein.

According to the present example, a guest page 402 includes code that includes a function call 404. For example, MethodA may be a function to write data to multiple privileged pages. In order to perform such a function, MethodA includes an instruction to jump to address 1 406, which corresponds to the trampoline page 410.

At address 1 406 within the trampoline page, the guest executes VMFUNC(1) of the first virtual machine function 408, which switches the view to the first privileged view. In the first privileged view, the guest has access to the trusted code 430 of the trusted code page 432. Additionally, the guest has access to the first privileged page 416.

Then, the guest calls MethodB, which includes an instruction to store data 418 at address 2 414, which is within the first privileged page 416. After writing the data 418 to the first privileged page 416, the guest executes a return instruction, which causes the processor to execute the next instruction after CALL MethodB. The next instruction is a VMFUNC(0) instruction that returns the view to the default view.

Then, the guest executes VMFUNC(1) of the second virtual machine function 412, which switches the view to the second privileged view. In the second privileged view, the guest has access to the trusted code 430 of the trusted code page 432. Additionally, the guest has access to the second privileged page 422.

Then, the guest calls MethodC, which includes an instruction to store data 424 at address 3 420, which is within the second privileged page 422. After writing the data 424 to the second privileged page 422, the guest executes a return instruction, which causes the processor to execute the next instruction after CALL MethodC. The next instruction is a VMFUNC(0) instruction that returns the view to the default view.

In some examples, the different virtual machine functions 408, 412 may have different trampoline code stored on different trampoline pages. Thus, the function call 404 would jump to the first trampoline page and then jump to the second trampoline page.

Figure 5:
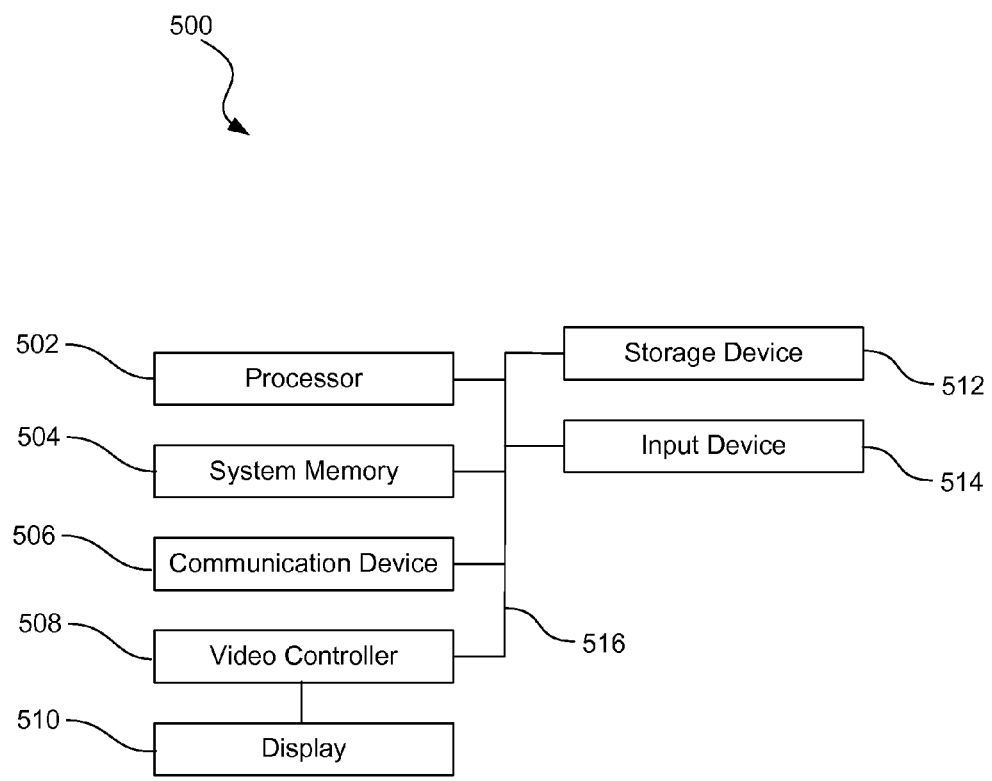
FIG. 5 is a diagram showing an illustrative computing system that can host virtual machines, according to one example of principles described herein.

FIG. 5 is a diagram of an illustrative computing system that may run several virtual machines and a hypervisor with functionality described herein. Specifically, the hypervisor may provide guest systems with multiple virtual machine functions for accessing multiple privileged pages. For example, the computing system 500 may include components of a server system that implements the method 200 described above.

According to the present example, the computing system 500 includes a processor 502, an input device 514, a storage device 512, a video controller 508, a system memory 504, a display 510, and a communication device 506, all of which are interconnected by one or more buses 516.

The storage device 512 may include a computer readable medium that can store data. The storage device 512 may include volatile memory storage devices such as Random Access Memory (RAM) as well as non-volatile memory storage devices such as solid state memory components. The computer readable medium may be a non-transitory tangible media.

In some examples, the communication device 506 may include a modem, network card, or any other device to enable the computing system 500 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 500 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, hand-held and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 504, and/or any combination thereof, may be executed by a processor 502 to cause the processor 502 to carry out or implement in whole or in part the operation of the computing system 500, one or more of the methods. In some examples, such a processor 502 may execute the plurality of instructions in connection with a virtual computer system.

Some examples of processing systems described herein may include non-transitory, tangible, machine readable media that include executable code that when run by one or more processors (e.g., processor 502) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
    with a guest running on a host computing system, requesting execution of a first virtual machine function;
    determining a first pointer value stored in a register of a processor running on the host system while the first virtual machine function is executed, the first pointer value pointing to a first page table, the first page table indicating that the guest has access to a first privileged page;
    in response to requesting execution of the first virtual machine function, switching to the first page table;
    after executing code while the guest has access to the first privileged page, switching to a default page table;
    with the guest, requesting execution of a second virtual machine function;
    determining a second pointer value stored in the register of the processor while the second virtual machine function is executed, the second pointer value pointing to a second page table, the second page table that indicates that the guest has access to a second privileged page; and
    in response to requesting execution of the second virtual machine function, switching to the second page table;
    after executing code while the guest has access to the second privileged page, switching to the default page table.

2. The method of claim 1, wherein the first page table disables write access to all privileged pages except for the first privileged page.

3. The method of claim 1, wherein the second page table disables write access to all privileged pages except for the second privileged page.

4. The method of claim 1, further comprising, with the guest, while the guest has access to the first privileged page, writing data to the first privileged page.

5. The method of claim 1, further comprising, with the guest, while the guest has access to the second privileged page, writing data to the second privileged page.

6. The method of claim 1, wherein switching to the default page table comprises determining a third pointer value in the register of the processor, the third pointer value pointing to the default page table.

7. The method of claim 1, wherein the default page table indicates that the guest does not have access to any privileged pages.

8. The method of claim 1, wherein the first privileged page is associated with one of:
hypervisor memory or guest memory for a different guest.

9. The method of claim 1, wherein the second privileged page is associated with one of:
hypervisor memory or guest memory for a different guest.

10. The method of claim 1, wherein the processor instructions for the first virtual machine function and the second virtual machine function are stored on a trampoline code page.

11. A method comprising:
storing a first virtual machine function instruction in memory;
storing a first Extended Page Table (EPT), the first EPT indicating that a guest has access to a first privileged page and that the guest does not have access to all other privileged pages;
storing a second virtual machine function instruction in memory; and
storing a second EPT, the second EPT indicating that a guest has access to a second privileged page and that the guest does not have access to all other privileged pages.

12. The method of claim 11, further comprising, executing the first virtual machine function instruction in association with a pointer to the first EPT.

13. The method of claim 11, further comprising, executing the second virtual machine function instruction in association with a pointer to the second EPT.

14. The method of claim 11, further comprising, with the guest, while the guest has access to the first privileged page, writing data to the first privileged page.

15. The method of claim 14, further comprising, after writing data to the first privileged page, denying the guest access to the first privileged page by executing a virtual machine function in association with a pointer to a default EPT.

16. The method of claim 11, further comprising, with the guest, while the guest has access to the second privileged page, writing data to the second privileged page.

17. The method of claim 16, further comprising, after writing data to the second privileged page, denying the guest access to the second privileged page by executing a virtual machine function in association with a pointer to a default EPT.

18. A method comprising:
with a guest running on a host computing system, executing a first virtual machine function instruction, the first virtual machine function instruction configured to provide the guest with write access to a first privileged page;
with the guest, writing data to the first privileged page;
with the guest, executing a second virtual machine function instruction to deny the guest write access to the first privileged page;
with the guest, executing a third virtual machine function instruction, the second virtual machine function configured to provide the guest with access to a second privileged page;
with the guest, writing data to the second privileged page; and
with the guest, executing a fourth virtual machine function instruction to deny the guest write access to the second privileged page.

19. The method of claim 18, wherein the second privileged page is associated with one of:
hypervisor memory or guest memory for a different guest.

20. The method of claim 18, wherein the processor instructions for the first virtual machine function and the second virtual machine function are stored on a trampoline code page.

* * * * *